(12) United States Patent
Shimomugi et al.

(10) Patent No.: US 9,608,556 B2
(45) Date of Patent: Mar. 28, 2017

(54) POWER CONVERSION DEVICE AND MOTOR DRIVE DEVICE INCLUDING POWER CONVERSION DEVICE

(71) Applicant: Mitsubishi Electric Corporation, Tokyo (JP)

(72) Inventors: Takuya Shimomugi, Tokyo (JP); Keisuke Uemura, Tokyo (JP); Koichi Arisawa, Tokyo (JP); Yosuke Shinomoto, Tokyo (JP); Shigeo Umehara, Tokyo (JP); Shinichiro Ura, Tokyo (JP); Makoto Tanikawa, Tokyo (JP)

(73) Assignee: Mitsubishi Electric Coporation, Tokyo (JP)

( * ) Notice: Subject to any disclaimer, the term of this patent is extended or adjusted under 35 U.S.C. 154(b) by 0 days.

(21) Appl. No.: 14/782,608

(22) PCT Filed: Apr. 12, 2013

(86) PCT No.: PCT/JP2013/061088
§ 371 (c)(1),
(2) Date: Oct. 6, 2015

(87) PCT Pub. No.: WO2014/167714
PCT Pub. Date: Oct. 16, 2014

(65) Prior Publication Data
US 2016/0094177 A1 Mar. 31, 2016

(51) Int. Cl.
*H02P 27/08* (2006.01)
*H02M 7/5387* (2007.01)
(Continued)

(52) U.S. Cl.
CPC .......... *H02P 27/085* (2013.01); *H02M 7/501* (2013.01); *H02M 7/5395* (2013.01);
(Continued)

(58) Field of Classification Search
CPC ..................................................... H02P 27/085
(Continued)

(56) References Cited

U.S. PATENT DOCUMENTS

| | | | | |
|---|---|---|---|---|
| 7,598,698 B2 * | 10/2009 | Hashimoto | ............. | H02P 21/18 318/798 |
| 8,605,461 B2 * | 12/2013 | Hibino | ............. | H02M 7/53875 363/130 |
| 8,816,612 B2 * | 8/2014 | Suzuki | ................... | H02P 27/08 318/139 |

FOREIGN PATENT DOCUMENTS

| | | |
|---|---|---|
| JP | H09-093948 A | 4/1997 |
| JP | 2003-209976 A | 7/2003 |

(Continued)

OTHER PUBLICATIONS

International Search Report of the International Searching Authority mailed Jul. 16, 2013 for the corresponding international application No. PCT/JP2013/061088 (and English translation).

*Primary Examiner* — David S Luo
(74) *Attorney, Agent, or Firm* — Posz Law Group, PLC

(57) ABSTRACT

A power conversion device includes a power-supply shunt resistance that is provided between an inverter and the negative-voltage side of a DC power supply, and respective-phase lower-arm shunt resistances that are provided between the power-supply shunt resistance and respective-phase lower-arm switching elements. Respective-phase lower-arm voltages, that are respective voltages between the negative-voltage side of the DC power supply and connection points between the respective-phase lower-arm switching elements and the respective-phase lower-arm shunt resistances, are detected to calculate respective-phase currents that flow through a load device in accordance with detection values of the respective-phase lower-arm voltages, and to control a carrier frequency of a carrier signal, which serves as a
(Continued)

reference frequency of each drive signal, according to a change in a specific control parameter A.

18 Claims, 9 Drawing Sheets

(51) Int. Cl.
    *H02M 7/501*          (2007.01)
    *H02M 7/5395*        (2006.01)
    *H02M 1/00*           (2006.01)

(52) U.S. Cl.
    CPC ............... *H02M 7/53875* (2013.01); *H02M 2001/0009* (2013.01); *H02P 2205/01* (2013.01)

(58) Field of Classification Search
    USPC ............................. 318/400.2, 400.01, 700
    See application file for complete search history.

(56) References Cited

FOREIGN PATENT DOCUMENTS

| | | |
|---|---|---|
| JP | 2006-067747 A | 3/2006 |
| JP | 2006-101685 A | 4/2006 |
| JP | 2006-254671 A | 9/2006 |
| JP | 2007-236188 A | 9/2007 |
| JP | 2011-004539 A | 1/2011 |
| JP | 2011-050183 A | 3/2011 |

\* cited by examiner

POWER CONVERSION DEVICE AND MOTOR DRIVE DEVICE INCLUDING POWER CONVERSION DEVICE

CROSS REFERENCE TO RELATED APPLICATION

This application is a U.S. national stage application of International Patent Application No. PCT/JP2013/061088 filed on Apr. 12, 2013, the disclosure of which is incorporated herein by reference.

TECHNICAL FIELD

The present invention relates to a power conversion device, a motor drive device including the power conversion device, an air blower and a compressor including the motor drive device, and an air conditioner, a refrigerator, and a freezer including the air blower and the compressor.

BACKGROUND

A power conversion device generates and supplies three-phase AC voltages to a load by combining ON/OFF states of switching elements that constitute a PWM three-phase inverter. In this power conversion device, respective-phase currents that flow through a three-phase load such as a motor are detected, and the load is controlled on the basis of the detected respective-phase currents.

As a unit that detects the respective-phase currents that flow through the three-phase load, a current sensor or a shunt resistance is provided, which is connected in series to the switching elements that constitute the inverter. As a configuration including the shunt resistance, a power-supply shunt resistance is provided that detects a current between a DC power supply and an inverter device or a lower-arm shunt resistance that detects a phase current of the corresponding phase is provided between a lower-arm switching element and the negative side of the DC power supply. With the configuration including the power-supply shunt resistance or the lower-arm shunt resistance, it is necessary to specify a detected phase current in each phase. This complicates the control software. Further, with the configuration including the power-supply shunt resistance, when a current for a single phase can only be detected, it is necessary to adjust the energization in order to detect currents for two phases. That is, in one switching cycle, the period for detecting each phase current is limited to a narrow range. Therefore, an inverter device is disclosed that can detect a phase current using simple control software that does not need to specify a detected current in each phase, to adjust energization, or to detect a current in a time-series manner, for example, by means of "providing a power-supply shunt resistance and lower-arm shunt resistances for at least two phases and detecting a phase current by using the power-supply shunt resistance, which cannot be detected by the lower-arm shunt resistances" (for example, Patent Literature 1).

PATENT LITERATURE

Patent Literature 1: Japanese Patent Application Laid-open No. 2006-67747

When a digital control unit such as a microcomputer is used as a unit that detects a phase current and executes the subsequent control, a certain amount of processing time is required for analog/digital conversion (AD conversion) of an analog value of each shunt-resistance voltage, for phase-current detection, and for the subsequent control. In the technique described in Patent Literature 1 listed above, a phase-current detection is performed by the lower-arm shunt resistances, and whether a phase current can be detected is determined, and then when the phase current cannot be determined by the lower-arm shunt resistances, the power-supply shunt resistance is used to detect the phase current. Therefore, in a case with a high carrier frequency, or depending on the inverter modulation factor, a switching ON/OFF state may be changed rapidly, and this can cause a delay in the processing in the control unit, or a phase current cannot be detected. This reduces the accuracy of the subsequent processing that is performed based on a detection value of the phase current. Particularly, when the carrier frequency is changed in order to improve performance of an apparatus or a device having a power conversion device incorporated therein, there is a problem in that it is difficult to detect a current phase.

SUMMARY

The present invention has been achieved to solve the above problems, and an object of the present invention is to provide a power conversion device that can achieve both an extended phase-current detection period and a simplified phase-current detection procedure, and that can also improve performance of an apparatus or a device by controlling a carrier frequency.

In order to solve the aforementioned problems, a power conversion device according to one aspect of the present invention, which converts DC power supplied from a DC power supply to three-phase AC power and supplies the AC power to a load device is constructed to include: an inverter that is configured by connecting arms for three phases in parallel, each of which is made up of an upper-arm switching element and a lower-arm switching element; a power-supply shunt resistance that is provided between the inverter and a negative-voltage side of the DC power supply; respective-phase lower-arm shunt resistances that are provided between the power-supply shunt resistance and the respective-phase lower-arm switching elements; respective-phase lower-arm voltage detection units that detect a voltage between the negative-voltage side of the DC power supply and connection points between the respective-phase lower-arm switching elements and the respective-phase lower-arm shunt resistances; and a control unit that calculates respective-phase currents that flow through the load device according to values detected by the respective-phase lower-arm voltage detection units, and that generates six drive signals corresponding to the respective-phase upper-arm switching elements and the respective-phase lower-arm switching elements according to the respective-phase currents, wherein the control unit controls a carrier frequency of a carrier signal, which serves as a reference frequency of the drive signals, according to a change in a specific control parameter.

According to the present invention, both an extended phase-current detection period and a simplified phase-current detection procedure are achieved, and performance of an apparatus or a device can be also improved by controlling a carrier frequency.

DETAILED DESCRIPTION

A power conversion device according to exemplary embodiments of the present invention will be explained below in detail with reference to the accompanying drawings. The present invention is not limited to the embodiments.

Embodiment

Figure 1:
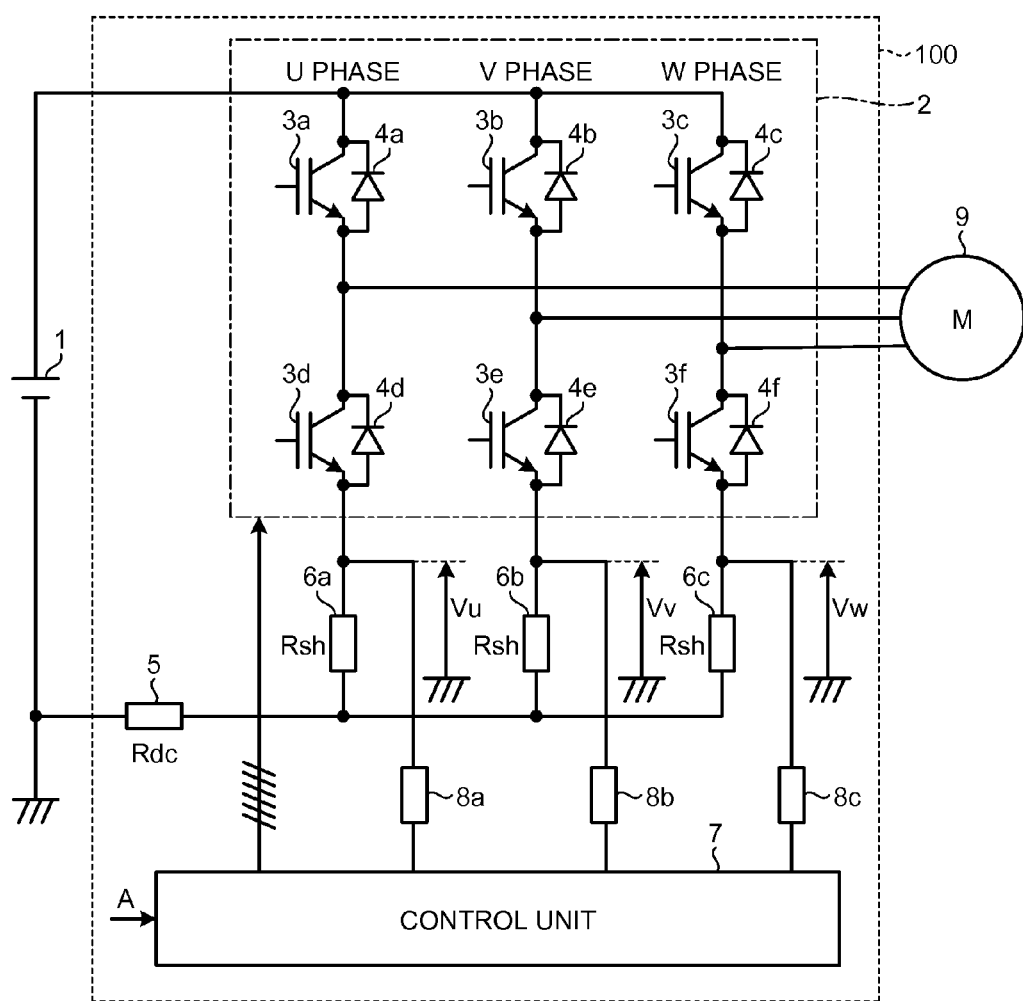
FIG. 1 is a diagram illustrating a configuration example of a power conversion device according to an embodiment.

FIG. 1 is a diagram illustrating a configuration example of a power conversion device according to an embodiment of the present invention. In the example illustrated in FIG. 1, a power conversion device 100 according to the present embodiment is configured to convert DC power supplied from a DC power supply 1 to three-phase AC power to be supplied to a load device (a motor in the example illustrated in FIG. 1) 9.

As illustrated in FIG. 1, the power conversion device 100 includes an inverter 2 and a control unit 7 as a main constituent element for supplying three-phase AC power to the load device 9, wherein the inverter 2 is configured from three arms made up of upper-arm switching elements 3a to 3c (in this example, 3a: a U-phase, 3b: a V-phase, and 3c: a W-phase) and lower-arm switching elements 3d to 3f (in this example, 3d: a U-phase, 3e: a V-phase, and 3f: a W-phase). The control unit 7 generates six drive signals that correspond to the respective-phase upper-arm switching elements 3a to 3c and the respective-phase lower-arm switching elements 3d to 3f, and outputs these six drive signals to the respective-phase upper-arm switching elements 3a to 3c and the respective-phase lower-arm switching elements 3d to 3f. The respective-phase upper-arm switching elements 3a to 3c and the respective-phase lower-arm switching elements 3d to 3f are configured by including freewheeling diodes 4a to 4f, each of which is connected in anti-parallel (in this example, 4a: a U-phase upper arm, 4b: a V-phase upper arm, 4c: a W-phase upper arm, 4d: a U-phase lower arm, 4e: a V-phase lower arm, and 4f: a W-phase lower arm).

The control unit 7 is configured by a microcomputer or a CPU, for example. The control unit 7 is a computation and control unit that converts an input analog voltage signal to a digital value to perform computation and control in accordance with a control application of the load device 9.

The power conversion device 100 according to the present embodiment further includes a power-supply shunt resistance 5, respective-phase lower-arm shunt resistances 6a, 6b, and 6c (in this example, 6a: a U-phase, 6b: a V-phase, and 6c: a W-phase), and respective-phase lower-arm voltage detection units 8a, 8b, and 8c (in this example, 8a: a U-phase, 8b: a V-phase, and 8c: a W-phase). The power-supply shunt resistance 5 is provided between the inverter 2 and the negative-voltage side of the DC power supply 1 (GND in the example illustrated in FIG. 1). The respective-phase lower-arm shunt resistances 6a, 6b, and 6c are provided between the power-supply shunt resistance 5 and the respective-phase lower-arm switching elements 3d, 3e, and 3f. The respective-phase lower-arm voltage detection units 8a, 8b, and 8c detect respective voltages (hereinafter, "respective-phase lower-arm voltages") Vu, Vv, and Vw between the negative-voltage side of the DC power supply 1 (GND in this example) and connection points between the respective-phase lower-arm switching elements 3d, 3e, and 3f and the respective-phase lower-arm shunt resistances 6a, 6b, and 6c. In the example illustrated in FIG. 1, the resistance value of the power-supply shunt resistance 5 is represented as Rdc, and the resistance value of the respective-phase lower-arm shunt resistances 6a, 6b, and 6c is represented as Rsh.

Each of the respective-phase lower-arm voltage detection units 8a, 8b, and 8c is configured by, for example, an amplification unit that amplifies each of the respective-phase lower-arm voltages Vu, Vv, and Vw to a voltage value that is easily processed by the control unit 7.

Figure 2:
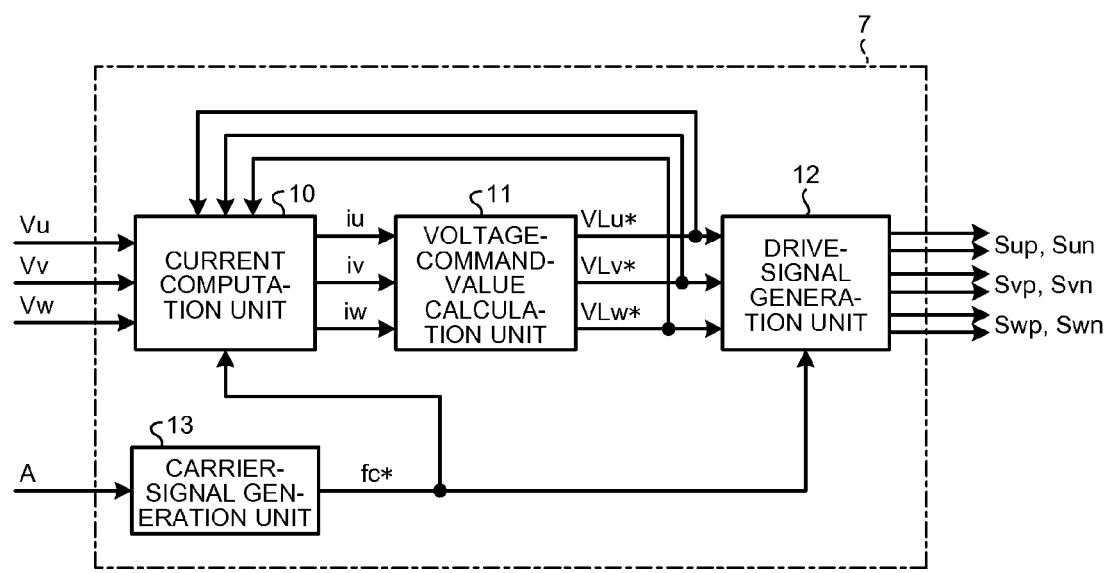
FIG. 2 is a diagram illustrating a configuration example of a control unit of the power conversion device according to the embodiment.

FIG. 2 is a diagram illustrating a configuration example of a control unit of the power conversion device according to the present embodiment. The control unit 7 of the power conversion device 100 according to the present embodiment includes a current computation unit 10, a voltage-command-value calculation unit 11, a drive-signal generation unit 12, and a carrier-signal generation unit 13. The current computation unit 10 computes respective-phase currents iu, iv, and iw that flow through respective-phase windings of the load device 9 according to the respective-phase lower-arm voltages Vu, Vv, and Vw detected by the respective-phase lower-arm voltage detection units 8a, 8b, and 8c. The voltage-command-value calculation unit 11 calculates respective-phase voltage command values VLu*, VLv*, and VLw* that are output from the inverter 2 to the respective-phase windings of the load device 9 according to the respective-phase currents iu, iv, and iw output from the current computation unit 10. The drive-signal generation unit 12 generates respective drive signals Sup, Sun, Svp, Svn, Swp, and Swn that are output to the respective-phase upper-arm switching elements 3a to 3c and the respective-phase lower-arm switching elements 3d to 3f according to the respective-phase voltage command values VLu*, VLv*, and VLw* output from the voltage-command-value calculation unit 11. According to a change in a specific control parameter ("A" in FIG. 2), the carrier-signal generation unit 13 generates a carrier signal fc*, such as a triangular wave or a sawtooth wave, that serves as a reference frequency of the respective drive signals Sup, Sun, Svp, Svn, Swp, and Swn.

From the respective-phase voltage command values VLu*, VLv*, and VLw* output from the voltage-command-value calculation unit 11, and from the carrier signal fc* output from the carrier-signal generation unit 13, the current computation unit 10 determines an ON/OFF state of the respective-phase upper-arm switching elements 3a to 3c in a space-vector modulation method described later, and computes the respective-phase currents iu, iv, and iw in accordance with the ON/OFF state of the respective-phase upper-arm switching elements 3a to 3c. A computation method of the respective-phase currents iu, iv, and iw according to the ON/OFF state of the respective-phase upper-arm switching elements 3a to 3c in this space-vector modulation method is described later.

According to the respective-phase currents iu, iv, and iw output from the current computation unit 10, the voltage-command-value calculation unit 11 calculates the respective-phase voltage command values VLu*, VLv*, and VLw* converted to the ON duty of the respective drive signals Sup, Sun, Svp, Svn, Swp, and Swn output from the drive-signal generation unit 12 (that is, the ON duty is the ratio of ON time of the respective-phase upper-arm switching elements 3a to 3c and the respective-phase lower-arm switching elements 3d to 3f within one switching cycle).

The drive-signal generation unit 12 compares the respective-phase voltage command values VLu*, VLv*, and VLw* output from the voltage-command-value calculation unit 11 with the carrier signal fc* output from the carrier-signal generation unit 13. On the basis of the magnitude relation between the carrier signal fc* and the respective-phase voltage command values VLu*, VLv*, and VLw*, the drive-signal generation unit 12 generates the respective drive signals Sup, Sun, Svp, Svn, Swp, and Swn that are output to the respective switching elements 3a to 3f.

The configuration of the control unit 7 described above is merely an example for controlling the load device 9. The present invention is not limited by this configuration and control method of the control unit 7. A carrier-frequency control according to a change in the control parameter A in the carrier-signal generation unit 13 is described later.

Figure 3:
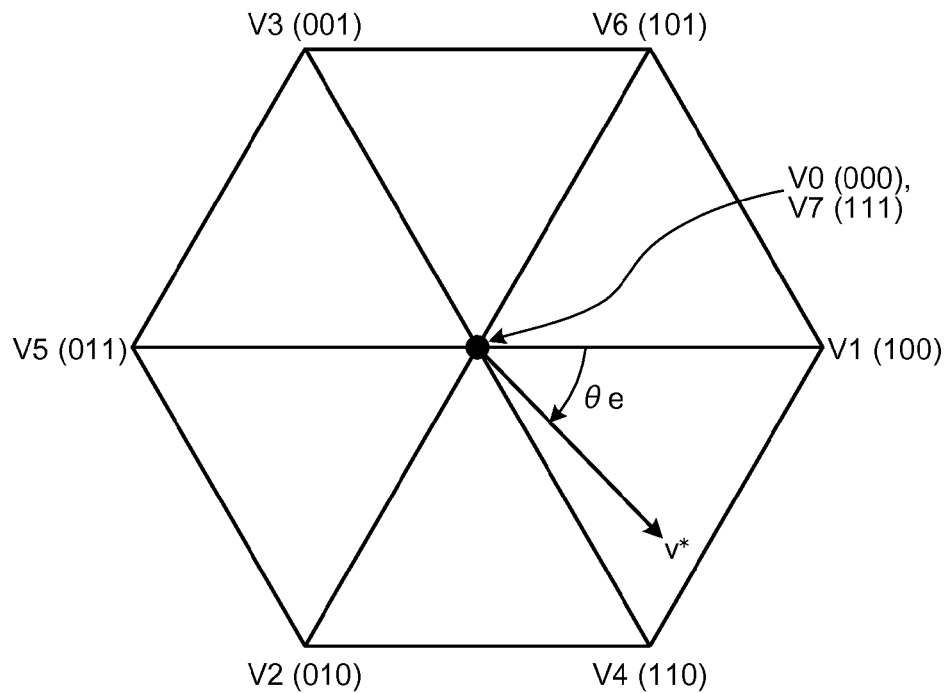
FIG. 3 are diagrams illustrating a relation between an inverter output-voltage vector and an ON/OFF state of respective-phase upper-arm switching elements in a space-vector modulation method.

Next, there is described the space-vector modulation method for generating a drive signal to the respective-phase upper-arm switching elements 3a to 3c and the respective-phase lower-arm switching elements 3d to 3f by means of PWM. FIG. 3 are diagrams illustrating the relation between an inverter output-voltage vector and an ON/OFF state of respective-phase upper-arm switching elements in the space-vector modulation method. FIG. 3(a) is a schematic diagram illustrating the relation between an output-voltage vector of the inverter 2 and an ON/OFF state of the respective-phase upper-arm switching elements 3a to 3c. FIG. 3(b) illustrates the definition of the output-voltage vector of the inverter 2. In the example illustrated in FIG. 3, the ON state of the respective-phase upper-arm switching elements 3a to 3c is defined as "1", and the OFF state of the respective-phase upper-arm switching elements 3a to 3c is defined as "0".

As illustrated in FIG. 3, there are two patterns: the ON state (that is, "1") and the OFF state (that is, "0"), as an ON/OFF state of the respective-phase upper-arm switching elements 3a to 3c. When corresponding to a combination of the ON/OFF states of the respective-phase upper-arm switching elements 3a to 3c, the output-voltage vector of the inverter 2 is defined in the configuration of ((a state of the U-phase upper-arm switching element 3a) (a state of the V-phase upper-arm switching element 3b) (a state of the W-phase upper-arm switching element 3c)), then there are eight patterns: V0(000), V1(100), V2(010), V3(001), V4(110), V5(011), V6(101), and V7(111). Among these inverter output-voltage vectors, the vectors V0(000) and V7(111) with no magnitude are referred to as a "zero vector", and the other vectors V1(100), V2(010), V3(001), V4(110), V5(011), and V6(101) with the same magnitude and a phase difference of 60 degrees from each other are referred to as "real vector".

The control unit 7 merges these zero vectors V0 and V7 and these real vectors V1 to V6 in any combination, and generates drive signals with three-phase PWM voltages corresponding to the respective-phase upper-arm switching elements 3a to 3c and the respective-phase lower-arm switching elements 3d to 3f.

Next, the computation method of the respective-phase currents iu, iv, and iw in the power conversion device 100 according to the present embodiment is described with reference to FIGS. 4 to 10.

Figure 4:
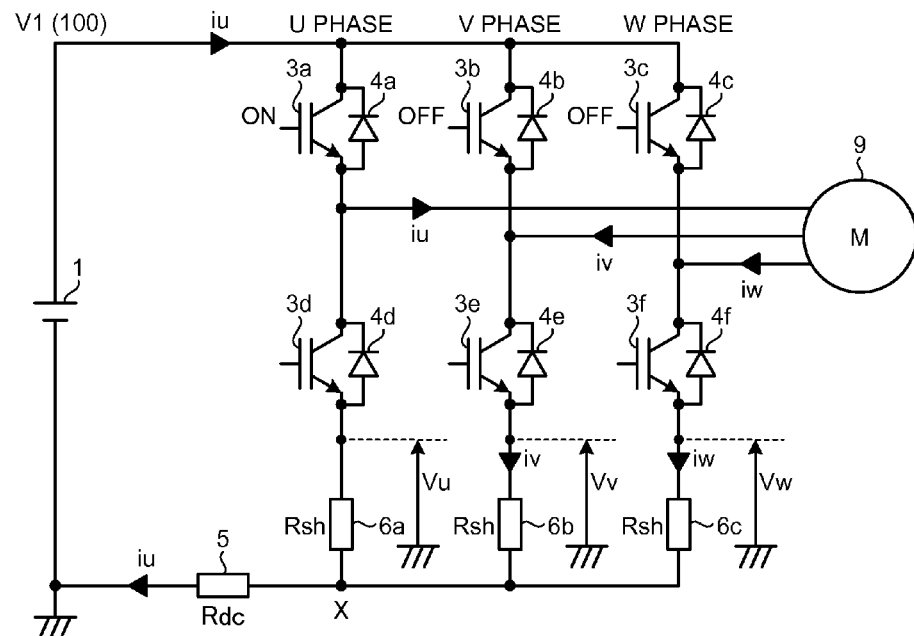
FIG. 4 is a diagram illustrating a current that flows through each section of an inverter when the inverter output-voltage vector is a real vector V1(100).

FIG. 4 is a diagram illustrating a current that flows through each section of an inverter when the inverter output-voltage vector is the real vector V1(100). In the example illustrated in FIG. 4, each of the respective-phase currents iu, iv, and iw that flow from the higher-potential side to the lower-potential side of the respective-phase windings of the load device (the motor in this example) 9 is described as a positive value. In the examples illustrated in the following diagrams, the respective-phase currents iu, iv, and iw are described in the same manner as in FIG. 4.

As illustrated in FIG. 4, when the output-voltage vector of the inverter 2 is the real vector V1(100), the U-phase current iu flows from the positive-voltage side of the DC power supply 1 through the U-phase upper-arm switching element 3a toward the motor 9. A V-phase current iv flows from the motor 9 through the V-phase lower-arm switching element 3e, the V-phase lower-arm shunt resistance 6b, and the power-supply shunt resistance 5 toward the negative-voltage side of the DC power supply 1. A W-phase current iw flows from the motor 9 through the W-phase lower-arm switching element 3f and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (1), (2), and (3).

$$Vu = iu \times Rdc \quad (1)$$

$$Vv = iu \times Rdc + iv \times Rsh \quad (2)$$

$$Vw = iu \times Rdc + iw \times Rsh \quad (3)$$

That is, when the output-voltage vector of the inverter 2 is the real vector V1(100), the respective-phase currents iu, iv, and iw can be calculated using the above equations (1), (2), and (3).

Figure 5:
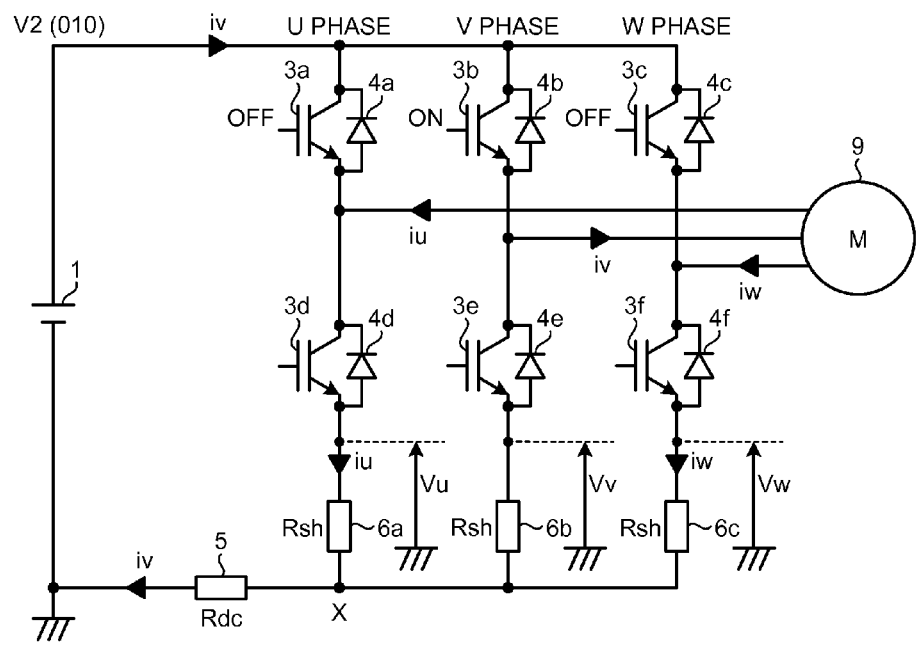
FIG. 5 is a diagram illustrating a current that flows through each section of an inverter when the inverter output-voltage vector is a real vector V2(010).

FIG. 5 is a diagram illustrating a current that flows through each section of an inverter when the inverter output-voltage vector is the real vector V2(010).

As illustrated in FIG. 5, when the output-voltage vector of the inverter 2 is the real vector V2(010), the V-phase current iv flows from the positive-voltage side of the DC power supply 1 through the V-phase upper-arm switching element 3b toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. The W-phase current iw flows from the motor 9 through the W-phase lower-arm switching element 3f and the power-supply shunt resistance 5 toward the negative-voltage-side terminal of the DC power supply 1. At this time, the U-phase lower-arm voltage Vu, the V-phase lower-arm voltage Vv, and the W-phase lower-arm voltage Vw can be expressed by the following equations (4), (5), and (6).

$$Vu = iv \times Rdc + iu \times Rsh \qquad (4)$$

$$Vv = iv \times Rdc \qquad (5)$$

$$Vw = iv \times Rdc + iw \times Rsh \qquad (6)$$

That is, when the output-voltage vector of the inverter 2 is the real vector V2(010), the respective-phase currents iu, iv, and iw can be calculated using the above equations (4), (5), and (6).

Figure 6:
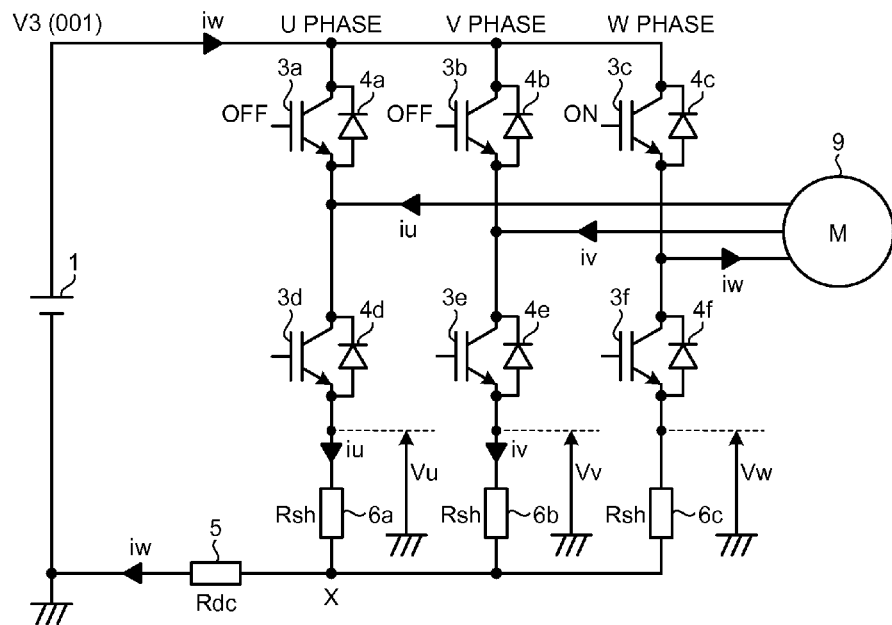
FIG. 6 is a diagram illustrating a current that flows through each section of an inverter when the inverter output-voltage vector is a real vector V3(001).

FIG. 6 is a diagram illustrating a current that flows through each section of an inverter when the inverter output-voltage vector is the real vector V3(001).

As illustrated in FIG. 6, when the output-voltage vector of the inverter 2 is the real vector V3(001), the W-phase current iw flows from the positive-voltage side of the DC power supply 1 through the W-phase upper-arm switching element 3c toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. The V-phase current iv flows from the motor 9 through the V-phase lower-arm switching element 3e and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (7), (8), and (9).

$$Vu = iw \times Rdc + iu \times Rsh \qquad (7)$$

$$Vv = iw \times Rdc + iv \times Rsh \qquad (8)$$

$$Vw = iw \times Rdc \qquad (9)$$

That is, when the output-voltage vector of the inverter 2 is the real vector V3(001), the respective-phase currents iu, iv, and iw can be calculated using the above equations (7), (8), and (9).

Figure 7:
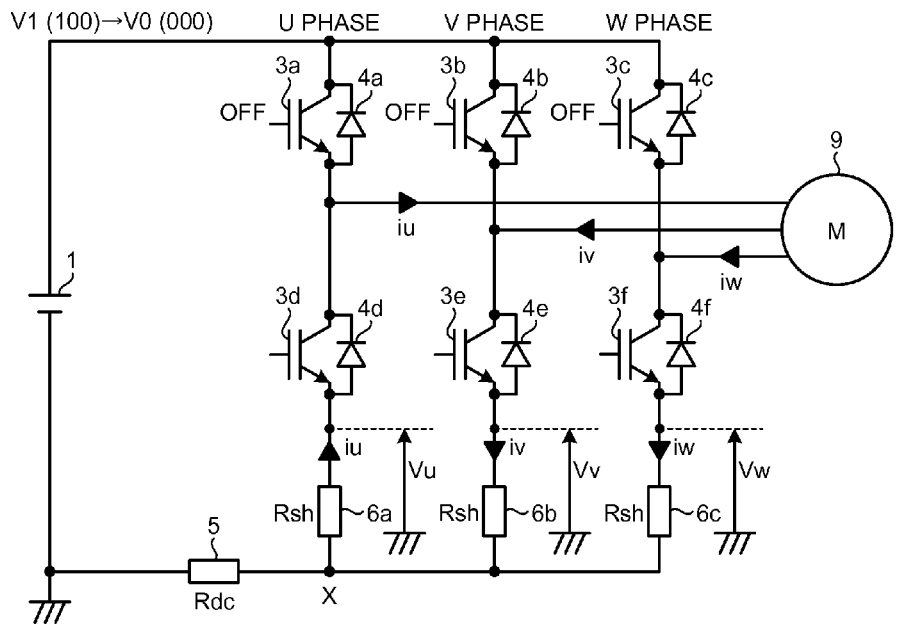
FIG. 7 is a diagram illustrating a current that flows through each section of an inverter when the inverter output-voltage vector is a zero vector V0(000).

FIG. 7 is a diagram illustrating a current that flows through each section of an inverter when the inverter output-voltage vector is the zero vector V0(000). As an example, FIG. 7 illustrates a current that flows through the inverter 2 when the output-voltage vector of the inverter 2 shifts from the real vector V1(100) to the zero vector V0(000).

As illustrated in FIG. 7, when the output-voltage vector of the inverter 2 shifts from the real vector V1(100) to the zero vector V0(000), a current hardly flows through the power-supply shunt resistance 5, and therefore the voltage at the X point is almost zero. At this time, the U-phase current iu flows from the X point through the freewheeling diode 4d toward the motor 9. The V-phase current iv flows from the motor 9 through the V-phase lower-arm switching element 3f and the V-phase lower-arm shunt resistance 6b toward the X point. The W-phase current iw flows from the motor 9 through the W-phase lower-arm switching element 3e toward the X point. At this time, the U-phase lower-arm voltage Vu, the V-phase lower-arm voltage Vv, and the W-phase lower-arm voltage Vw can be expressed by the following equations (10), (11), and (12).

$$Vu = (-iu) \times Rsh \qquad (10)$$

$$Vv = iv \times Rsh \qquad (11)$$

$$Vw = iw \times Rsh \qquad (12)$$

That is, when the output-voltage vector of the inverter 2 shifts from the real vector V1(100) to the zero vector V0(000), the respective-phase currents iu, iv, and iw can be calculated using the above equations (10), (11), and (12).

In this manner, in the power conversion device 100 according to the present embodiment, when the inverter output-voltage vector is the real vector V1(100), V2(010), V3(001), or the zero vector V0(000), the respective-phase currents iu, iv, and iw that flow through the respective-phase windings of the motor 9 can be calculated by detecting the U-phase lower-arm voltage Vu, the V-phase lower-arm voltage Vv, and the W-phase lower-arm voltage Vw.

Because the respective-phase currents iu, iv, and iw are obtained without using Kirchhoff's first law or the phase-current balancing condition, the power conversion device 100 is also applicable to a case where the motor 9 is an unbalanced load.

Figure 8:
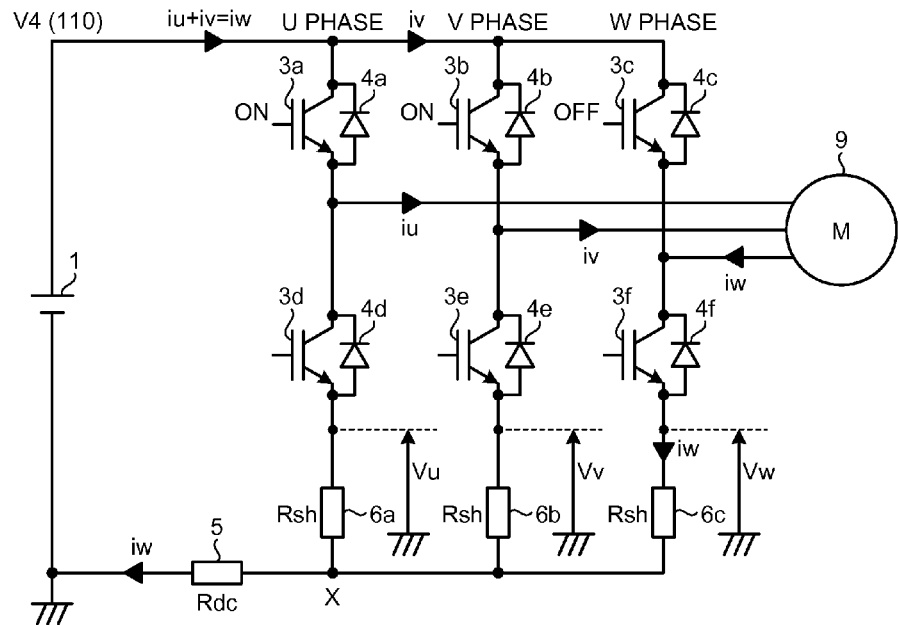
FIG. 8 is a diagram illustrating a current that flows through each section of an inverter when the inverter output-voltage vector is a real vector V4(110).

FIG. 8 is a diagram illustrating a current that flows through each section of an inverter when the inverter output-voltage vector is the real vector V4(110).

As illustrated in FIG. 8, when the output-voltage vector of the inverter 2 is the real vector V4(110), the U-phase current iu flows from the positive-voltage side of the DC power supply 1 through the U-phase upper-arm switching element 3a toward the motor 9, and the V-phase current iv flows from the positive-voltage side of the DC power supply 1 through the V-phase upper-arm switching element 3b toward the motor 9. The W-phase current iw flows from the motor 9 through the W-phase lower-arm switching element 3f, the W-phase lower-arm shunt resistance 6c, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (13), (14), and (15).

$$Vu = iw \times Rdc \qquad (13)$$

$$Vv = iw \times Rdc \qquad (14)$$

$$Vw = iw \times Rdc + iw \times Rsh \qquad (15)$$

When the motor 9 is a three-phase balanced load, the following equations hold under the phase-current balancing condition.

$$iu + iv = iw \qquad (16)$$

$$iu = iv = (\tfrac{1}{2}) iw \qquad (17)$$

That is, when the output-voltage vector of the inverter 2 is the real vector V4(110), and the motor 9 is a three-phase balanced load, then the respective-phase currents iu, iv, and iw can be calculated using any one of the above equations (13), (14), and (15), and using the above equation (17).

Figure 9:
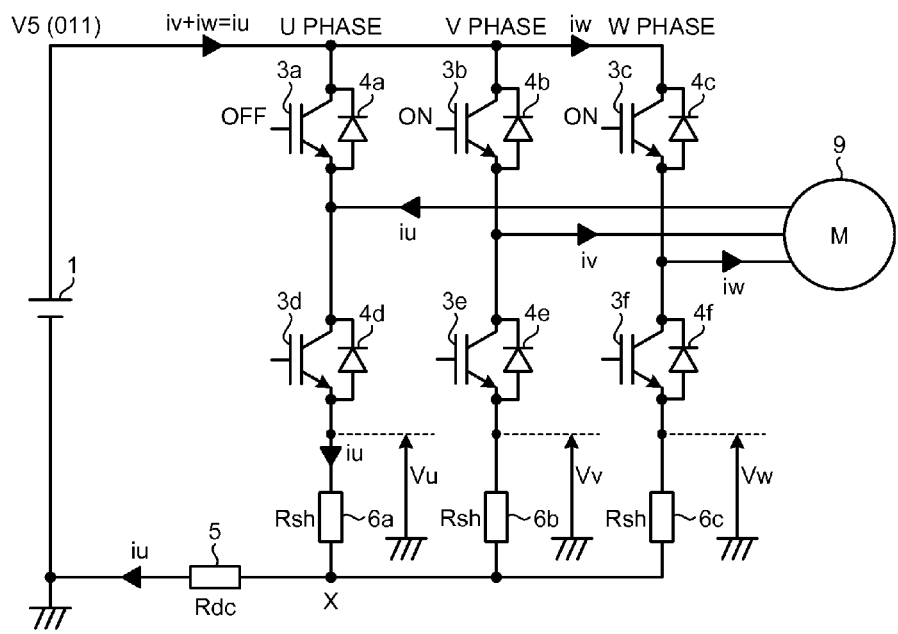
FIG. 9 is a diagram illustrating a current that flows through each section of an inverter when the inverter output-voltage vector is a real vector V5(011).

FIG. 9 is a diagram illustrating a current that flows through each section of an inverter when the inverter output-voltage vector is the real vector V5(011).

As illustrated in FIG. 9, when the output-voltage vector of the inverter 2 is the real vector V5(011), the V-phase current iv flows from the positive-voltage side of the DC power supply 1 through the V-phase upper-arm switching element 3b toward the motor 9, and the W-phase current iw flows from the positive-voltage side of the DC power supply 1 through the W-phase upper-arm switching element 3c toward the motor 9. The U-phase current iu flows from the motor 9 through the U-phase lower-arm switching element 3d, the U-phase lower-arm shunt resistance 6a, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (18), (19), and (20).

$$Vu = iu \times Rdc + iu \times Rsh \quad (18)$$

$$Vv = iu \times Rdc \quad (19)$$

$$Vw = iu \times Rdc \quad (20)$$

When the motor 9 is a three-phase balanced load, the following equations hold under the phase-current balancing condition.

$$iv + iw = iu \quad (21)$$

$$iv = iw = (\tfrac{1}{2})iu \quad (22)$$

That is, when the output-voltage vector of the inverter 2 is the real vector V5(011), and the motor 9 is a three-phase balanced load, then the respective-phase currents iu, iv, and iw can be calculated using any one of the above equations (18), (19), and 20, and using the above equation (22).

Figure 10:
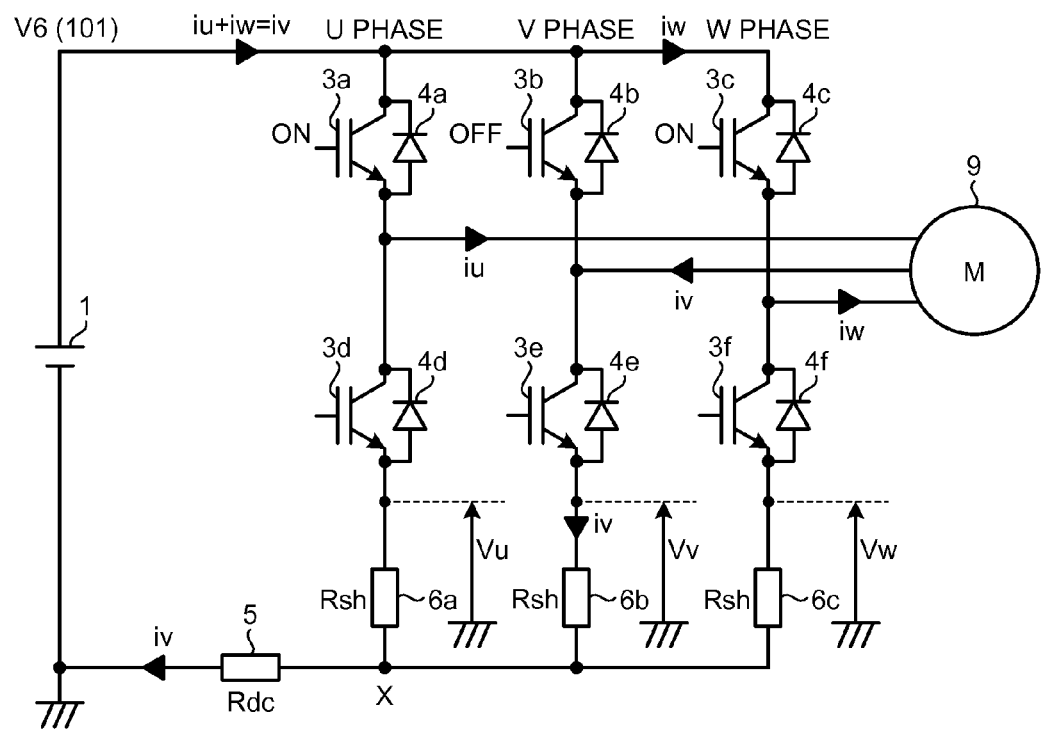
FIG. 10 is a diagram illustrating a current that flows through each section of an inverter when the inverter output-voltage vector is a real vector V6(101).

FIG. 10 is a diagram illustrating a current that flows through each section of an inverter when the inverter output-voltage vector is the real vector V6(101).

As illustrated in FIG. 10, when the output-voltage vector of the inverter 2 is the real vector V6(101), the U-phase current iu flows from the positive-voltage side of the DC power supply 1 through the U-phase upper-arm switching element 3a toward the motor 9, and the W-phase current iw flows from the positive-voltage side of the DC power supply 1 through the W-phase upper-arm switching element 3c toward the motor 9. The V-phase current iv flows from the motor 9 through the V-phase lower-arm switching element 3e, the V-phase lower-arm shunt resistance 6b, and the power-supply shunt resistance 5 toward the negative-voltage side of the DC power supply 1. At this time, the U-phase lower-arm voltage Vu, the V-phase lower-arm voltage Vv, and the W-phase lower-arm voltage Vw can be expressed by the following equations (23), (24), and (25).

$$Vu = iv \times Rdc \quad (23)$$

$$Vv = iv \times Rdc + iv \times Rsh \quad (24)$$

$$Vw = iv \times Rdc \quad (25)$$

When the motor 9 is a three-phase balanced load, the following equations hold under the phase-current balancing condition.

$$iu + iw = iv \quad (26)$$

$$iu = iw = (\tfrac{1}{2})iv \quad (27)$$

That is, when the output-voltage vector of the inverter 2 is the real vector V6(101) and the motor 9 is a three-phase balanced load, then the respective-phase currents iu, iv, and iw can be calculated using any one of the above equations (23), (24), and (25) and using the above equation (27).

In this manner, in the power conversion device 100 according to the present embodiment, in a case where the motor 9 is a three-phase balanced load, even when the inverter output-voltage vector is the real vector V4(110), V5(011), or V6(101), the respective-phase currents iu, iv, and iw that flow through the respective-phase windings of the motor 9 can still be calculated by detecting any one of the U-phase lower-arm voltage Vu, the V-phase lower-arm voltage Vv, and the W-phase lower-arm voltage Vw.

The configuration, in which lower-arm voltage detection units are provided for three phases, has been described above. However, even in a configuration in which the lower-arm voltage detection units are provided for two phases, when the load device 9 is a balanced load, it is still possible to calculate the respective-phase currents iu, iv, and iw by using Kirchhoff's first law or the phase-current balancing condition. However, detailed descriptions of this configuration are omitted.

Next, with reference to FIGS. 1, 2, and 11 to 15, there is described a carrier-frequency control according to a change in a specific control parameter A in the carrier-signal generation unit 13 of the power conversion device 100 according to the present embodiment.

In the present embodiment, the control parameters of the inverter 2 include all of: an output frequency of the inverter 2, input power of the inverter 2, output power of the inverter 2, a power consumption of the load device 9, a DC bus-voltage of the inverter 2, a converter operating-state signal that indicates an operating state of a converter when the DC power supply 1 is the converter, or an operational-state signal that indicates an operational state of the inverter 2.

First, an example is described in which the control parameter A is the output frequency of the inverter 2. When the control parameter A is the output frequency of the inverter 2, it is sufficient if an output-frequency command that is output from a higher control unit (not illustrated) is used as the control parameter A, and is input to the control unit 7, for example. Further, it is sufficient if a detection unit that detects an output frequency of the inverter 2 is provided to input a detection value of the output frequency to the control unit 7 as the control parameter A. Furthermore, it is sufficient if the electrical amount that changes according to the output frequency of the inverter 2, that is for example, the motor rotational speed when the load device 9 is the motor as illustrated in FIG. 1, is input to the control unit 7 as the control parameter A.

As illustrated in FIG. 2, there is a case where, for example, in synchronization with a carrier frequency of the carrier signal fc*, values detected by the respective-phase lower-arm voltage detection units 8a, 8b, and 8c are input to the current computation unit 10, and the respective-phase voltage command values VLu*, VLv*, and VLw* output from the voltage-command-value calculation unit 11 are input to the drive-signal generation unit 12. In this case, when the output frequency of the inverter 2 becomes higher, values detected by the respective-phase lower-arm voltage detection units 8a, 8b, and 8c are input to the control unit 7 less frequently, and the respective-phase voltage command values VLu*, VLv*, and VLw* are updated less frequently per cycle of the output frequency of the inverter 2. This degrades the controllability in the current computation unit 10 and the drive-signal generation unit 12.

Meanwhile, as the carrier frequency becomes higher, the number of switching operations increases in each of the switching elements 3*a* to 3*f* that constitute the inverter 2. Therefore, a switching loss increases, and the efficiency of an apparatus is degraded.

That is, it is sufficient if, when the output frequency of the inverter 2 is high, the carrier frequency is so controlled as to become high, and when the output frequency of the inverter 2 is low, the carrier frequency is so controlled as to become low. More specifically, the carrier frequency is controlled in such a manner as to maintain a constant ratio of the carrier-frequency cycle to one cycle of the output frequency of the inverter 2. This makes it possible to balance a switching loss and the controllability in the current computation unit 10 and the drive-signal generation unit 12.

Therefore, in the present embodiment, for example, a table that represents a relation between the carrier frequency and the output frequency of the inverter 2 is set in advance in the carrier-signal generation unit 13, and the carrier frequency is so controlled as to become a carrier frequency read from this table according to the output frequency of the inverter 2 input to the control unit 7 as the control parameter A.

More specifically, a table is set such that the period of one cycle of the output frequency of the inverter 2 is equal to the period of 10 cycles of the carrier frequency.

Controlling the carrier frequency in this manner can maintain a constant ratio of the carrier-frequency cycle to one cycle of the output frequency of the inverter 2. It is therefore possible to achieve both prevention of the controllability in the current computation unit 10 and the drive-signal generation unit 12 from being degraded, and suppression of a switching loss.

As an example of the method for easily obtaining the effects described above, a threshold value fα for an output frequency fo of the inverter 2, and a first carrier frequency fca and a second carrier frequency fcb (in this example, the first carrier frequency fca<the second carrier frequency fcb) are set in advance in the carrier-signal generation unit 13. It is sufficient if, when the output frequency fo of the inverter 2 that is input as the control parameter A is equal to or less than the threshold value fα (fo≤fα), the first carrier frequency fca is used as the carrier frequency, and when the output frequency fo of the inverter 2 is greater than the threshold value fα (fo>fα), the second carrier frequency fcb is used as the carrier frequency.

Figure 11:
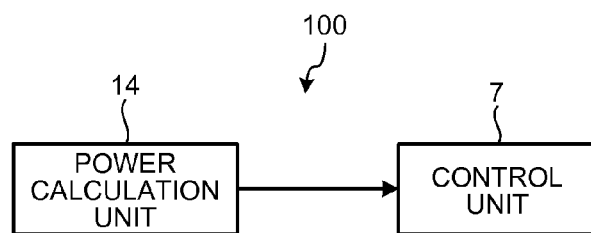
FIG. 11 is a diagram illustrating an example in which the power conversion device according to the present embodiment includes a power calculation unit.

Next, an example is described, in which the control parameter A is input power or output power of the inverter 2, or is a power consumption of the load device 9. FIG. 11 is a diagram illustrating an example in which the power conversion device according to the present embodiment includes a power calculation unit.

When the control parameter A is input power or output power of the inverter 2, or is a power consumption of the load device 9, it is sufficient if a power calculation unit 14 that calculates input power or output power of the inverter 2, or calculates a power consumption of the load device 9 is provided as illustrated in FIG. 11, and the power that is output from the power calculation unit 14 is input to the control unit 7 as the control parameter A. It is possible to configure the power calculation unit 14 by using the known technique. The present invention is not limited by this configuration of the power calculation unit 14. In the following descriptions, input power or output power of the inverter 2, or a power consumption of the load device 9 is collectively referred to as "inverter power".

As the inverter power increases, a switching loss increases accordingly in each of the switching elements 3*a* to 3*f* that constitute the inverter 2.

That is, it is sufficient if the carrier frequency is so controlled as to become low when the inverter power is high, and is so controlled as to become high when the inverter power is low.

Therefore, in the present embodiment, for example, a table that represents a relation between the inverter power and the carrier frequency is set in advance in the carrier-signal generation unit 13, and the carrier frequency is so controlled as to become a value read from this table in accordance with the inverter power that is input from the power calculation unit 14 as the control parameter A.

More specifically, a table is set such that as the inverter power increases, the carrier frequency becomes lower.

Controlling the carrier frequency in this manner can suppress a switching loss that increases with an increase in inverter power.

As an example of the method for easily obtaining the effects described above, a threshold value Pα for inverter power P, and the first carrier frequency fca and the second carrier frequency fcb (in this example, the first carrier frequency fca<the second carrier frequency fcb) are set in advance in the carrier-signal generation unit 13. It is sufficient if, when the inverter power P that is input as the control parameter A is equal to or less than the threshold value Pα (P≤Pα), the second carrier frequency fcb is used as the carrier frequency, and when the inverter power P is greater than the threshold value Pα (P>Pα), the first carrier frequency fca is used as the carrier frequency.

Figure 12:
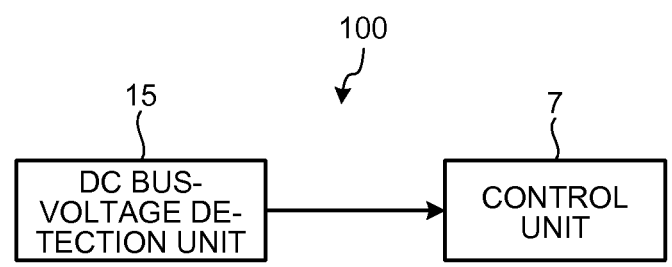
FIG. 12 is a diagram illustrating an example in which the power conversion device according to the present embodiment includes a DC bus-voltage detection unit.

Next, an example is described, in which the control parameter A is a DC bus-voltage of the inverter 2. FIG. 12 is a diagram illustrating an example in which the power conversion device according to the present embodiment includes a DC bus-voltage detection unit.

When the control parameter A is a DC bus-voltage of the inverter 2, a DC bus-voltage detection unit 15 that detects a DC bus-voltage of the inverter 2 is provided as illustrated in FIG. 12. It is sufficient if the DC bus-voltage that is output from the DC bus-voltage detection unit 15 is input to the control unit 7 as the control parameter A. It is possible to configure the DC bus-voltage detection unit 15 by using the known technique. The present invention is not limited by this configuration of the DC bus-voltage detection unit 15. Further, it is sufficient if the electrical amount that changes according to the DC bus-voltage, that is for example, the motor modulation ratio when the load device 9 is the motor as illustrated in FIG. 1, is input to the control unit 7 as the control parameter A.

As the DC bus-voltage increases, a switching loss increases accordingly in each of the switching elements 3*a* to 3*f* that constitute the inverter 2.

That is, it is sufficient if the carrier frequency is so controlled as to become low when the DC bus-voltage is high, and is so controlled as to become high when the DC bus-voltage is low.

Therefore, in the present embodiment, for example, a table that represents a relation between the DC bus-voltage and the carrier frequency is set in advance in the carrier-signal generation unit 13, and the carrier frequency is so controlled as to become a value read from this table according to the DC bus-voltage that is input from the DC bus-voltage detection unit 15 as the control parameter A.

More specifically, a table is set such that as the DC bus-voltage increases, the carrier frequency becomes lower.

Controlling the carrier frequency in this manner can suppress a switching loss that increases with an increase in DC bus-voltage.

As another example of the method for easily obtaining the effects described above, a threshold value Vα for a DC bus-voltage V, and the first carrier frequency fca and the second carrier frequency fcb (in this example, the first carrier frequency fca<the second carrier frequency fcb) are set in advance in the carrier-signal generation unit 13. It is sufficient if, when the DC bus-voltage V that is input as the control parameter A is equal to or less than the threshold value Vα (V≤Vα), the second carrier frequency fcb is used as the carrier frequency, and when the DC bus-voltage V is greater than the threshold value Vα (V>Vα), the first carrier frequency fca is used as the carrier frequency.

When the DC bus-voltage that is output from the DC power supply 1 is not stabilized, but is changed, a switching loss becomes relatively higher under the same load conditions. However, as described above, the switching loss can be reduced by decreasing the carrier frequency as the DC bus-voltage, which is input from the DC bus-voltage detection unit 15, increases.

Generally, when the inverter power or DC bus-voltage is high, a radiation fin may be needed depending on the heating value of each of the switching elements 3a to 3f that constitute the inverter 2. However, in the present embodiment, it is possible to arrange so as not to exceed the heat capacitance of the radiation fin by decreasing the carrier frequency with an increase in inverter power or DC bus-voltage, and therefore suppressing a switching loss. Further, it is possible to downsize this radiation fin.

Furthermore, greater effects can be obtained in a configuration in which, for each of the switching elements 3a to 3f that constitute the inverter 2, a switching element, formed from a wide-bandgap (WBG) semiconductor made of silicon carbide (SiC), a gallium nitride (GaN)-based material, or diamond, is used, for example.

The switching element formed from the WBG semiconductor as described above has a high heat resistance, and therefore it is possible to downsize a radiation fin. As described above, as the inverter power or DC bus-voltage becomes high, the carrier frequency is so controlled as to become low, and therefore it is possible to achieve further downsizing of the radiation fin.

Figure 13:
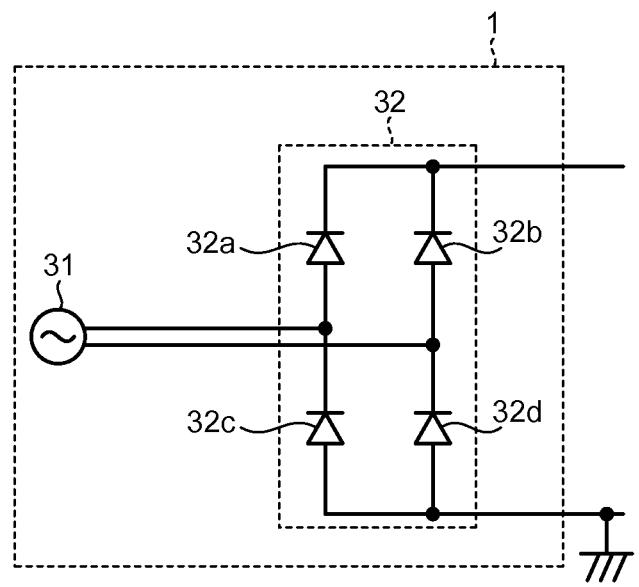
FIG. 13 is a diagram illustrating a configuration example in which an AC power supply is rectified to obtain a DC power supply.
Figure 14:
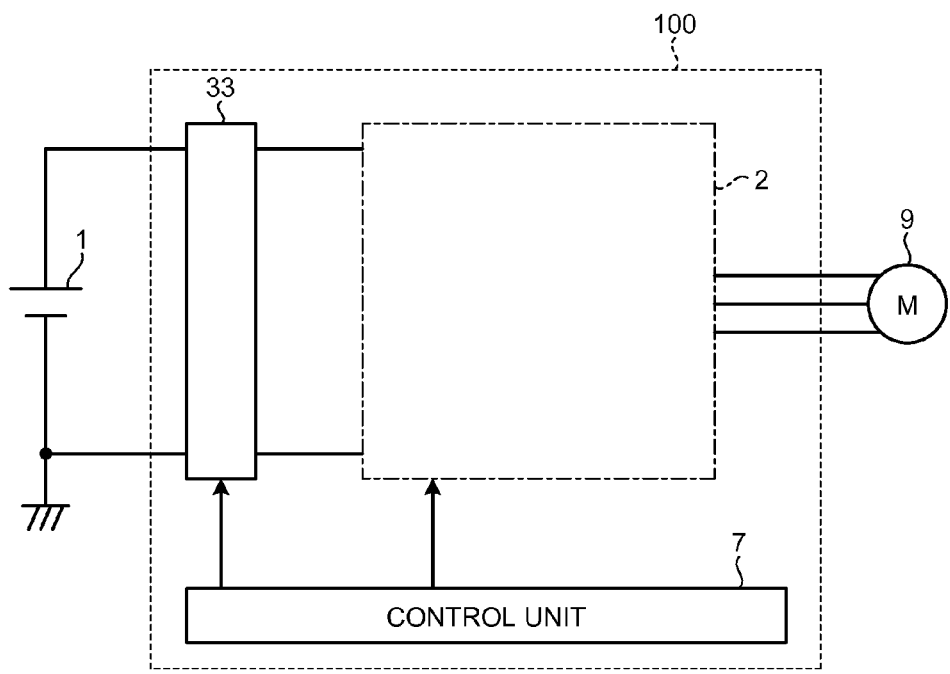
FIG. 14 is a diagram illustrating an example in which a converter is provided at a front stage of an inverter.

FIG. 13 is a diagram illustrating a configuration example in which an AC power supply is rectified to obtain a DC power supply. FIG. 14 is a diagram illustrating an example in which a converter is provided at a front stage of an inverter.

As illustrated in FIG. 13, an AC voltage supplied from an AC power supply 31 can be rectified by a rectifier 32 made up of rectifying diodes 32a to 32d to obtain the DC power supply 1. Also in the configuration as described above, even in a case where an AC voltage supplied from the AC power supply 31 is varied, and accordingly the resultant DC bus-voltage is varied, when the DC bus-voltage becomes high, the carrier frequency can still be decreased to suppress a switching loss.

In the example illustrated in FIG. 13, the AC power supply 31 is a single-phase AC power supply, and the rectifier 32 is a single-phase rectifier. However, it is apparent that the number of phases of the AC power supply 31 and the rectifier 32 is not limited, but can be any number of phases as long as the AC power supply 31 and the rectifier 32 can constitute the DC power supply 1.

When the control parameter A is a DC bus-voltage of the inverter 2, greater effects can be obtained in the configuration as illustrated in FIG. 14, in which at the front stage of the inverter 2, a converter 33 is provided that boosts or lowers, or that boosts and lowers the DC voltage output from the DC power supply 1.

In a case where the power conversion device 100 according to the present embodiment is applied to a motor drive device in which the load is a motor, in the configuration in which the converter 33 boosts the DC voltage output from the DC power supply 1 to obtain a DC bus-voltage, it is possible to extend the operational range of the motor. It is also possible to achieve high efficiency of the motor by increasing the number of motor windings to obtain a high voltage and decrease the current.

In the motor, there are constraints to its design conditions and drive conditions in order to prevent the occurrence of demagnetization of a magnet due to a diamagnetic field generated by a current that flows through a stator. In order to eliminate these constraints, a dysprosium element that is a rare-earth resource is added to the magnet in some cases to improve the magnetic coercive force. Assuming that a motor drive device is configured using the power conversion device 100 according to the present embodiment, in a motor with a small usage amount of dysprosium (for example, the dysprosium content is equal to or greater than 0% and equal to or less than 0.5%), and with a low demagnetization resistance (for example, the magnetic coercive force is equal to or less than 1700 kA/m), even when the DC bus-voltage is increased to reduce a diamagnetic field generated in a stator in order that the motor can be used within a temperature range and a rotational-speed range identical to those of a motor with a large usage amount of dysprosium, it is still possible to decrease the carrier frequency, and therefore suppress a switching loss.

In the configuration in which the converter 33 lowers the DC voltage output from the DC power supply 1 to obtain a DC bus-voltage, within a range where the motor load is low and the output voltage of the inverter 2 is lower than the DC voltage output from the DC power supply 1, a DC bus-voltage that is lowered to a voltage equivalent to the output voltage of the inverter 2 is obtained, and the obtained DC bus-voltage is applied to the inverter 2. This makes it possible to achieve a low loss in each of the switching elements 3a to 3f. Further, when the DC bus-voltage becomes high, the carrier frequency is decreased so as to improve the switching-loss suppression effect.

The converter 33 can be configured by only passive elements such as a reactor and a capacitor, or can include a reactor, a capacitor, and a switching element, and be configured to charge/discharge energy to/from the reactor by controlling the switching element to be opened or closed.

Further, when the converter 33 is configured by a reactor, a capacitor, and a switching element, and as illustrated in FIG. 14, the control unit 7 that controls the inverter 2 is configured to control the switching element within the converter 33 to be opened or closed, it is sufficient if the control parameter A is a converter operating-state signal that indicates an operating state of the converter 33.

When the control parameter A is the converter operating-state signal, it is sufficient if the converter operating-state signal is input from a higher control unit (not illustrated) to the control unit 7 as the control parameter A, for example. The converter operating-state signal is a known signal that is, for example, digital data or an analog electrical amount such as a voltage value that indicates whether the converter 33 is operated. The present invention is not limited by this type of converter operating-state signal.

When the control unit 7 controls the inverter 2 and the converter 33 simultaneously, its computation load increases.

For example, as illustrated in FIG. 2, there is a case where the control unit 7 executes a control in such a manner as to input values detected by the respective-phase lower-arm voltage detection units 8a, 8b, and 8c to the current computation unit 10, and as to input the respective-phase voltage command values VLu*, VLv*, and VLw* output from the voltage-command-value calculation unit 11 to the drive-signal generation unit 12, in synchronization with a carrier frequency of the carrier signal fc*. In this case, at the timing of a peak or valley of the carrier signal fc*, the control unit 7 starts computation related to the control on the inverter 2 and the control on the converter 33, and after at least one cycle, at the timing of a peak or valley of the carrier signal fc*, the control unit 7 updates the respective-phase voltage command values VLu*, VLv*, and VLw* that are the ON duty of each of the switching elements 3a to 3f that constitute the inverter 2, and updates the ON duty of a switching element that constitutes the converter 33, so that the updated ON duty takes effect.

That is, the control unit 7 needs to perform computation related to the control on the inverter 2 and the control on the converter 33 within a preset reference period that is one cycle of the carrier signal fc*. Therefore, when the control unit 7 operates the inverter 2 and the converter 33 simultaneously, its computation load is so high that when the carrier frequency is high, the control unit 7 spends only a short time for performing the computation related to the control on the inverter 2 and the control on the converter 33. This may cause a decrease in controllability because the control unit 7 cannot finish the computation in time, or may cause an apparatus to stop because the control unit 7 cannot execute a control.

Therefore, in the present embodiment, when the control parameter A is the converter operating-state signal, and the control unit 7 operates the inverter 2 and the converter 33 simultaneously, then the control unit 7 sets a low carrier frequency to prevent circumstances such as a decrease in controllability because the control unit 7 cannot finish the computation in time, or a stop of an apparatus because the control unit 7 cannot execute a control.

Next, an example is described in which the control parameter A is an operational-state signal that indicates an operational state of the inverter 2.

When the control parameter A is the operational-state signal, it is sufficient if the operational-state signal is input from a higher-stage control unit (not illustrated) to the control unit 7 as the control parameter A, for example. The operational-state signal is a known signal that is, for example, digital data or an analog electrical amount such as a voltage value that differs in each operational state at the time of a start-up, a stop, or a steady operation of the inverter 2. The present invention is not limited by this type of operational-state signal.

Figure 15:
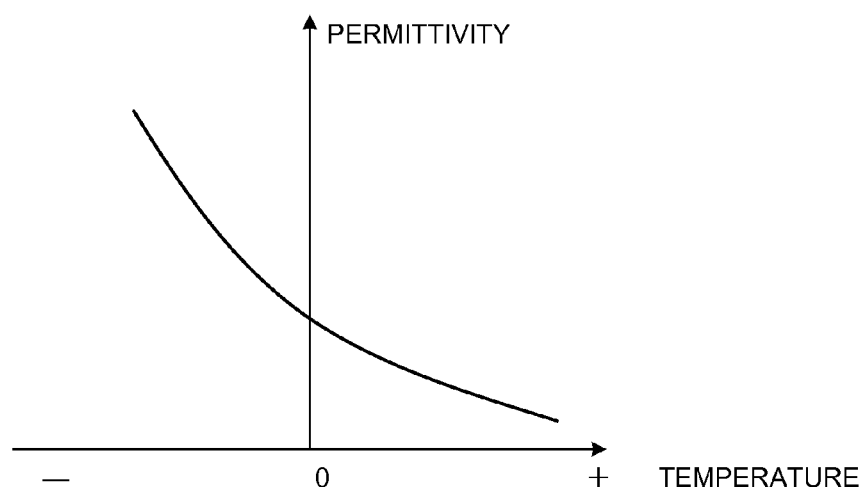
FIG. 15 is a diagram illustrating an example of permittivity temperature characteristics of a refrigerant used in a compressor.

A case is described with reference to FIG. 15, in which the power conversion device 100 according to the present embodiment is applied to a motor drive device in which the load is a motor, and this motor drive device is applied to a compressor for an air conditioner, a refrigerator, a freezer, or other devices. FIG. 15 is a diagram illustrating an example of permittivity temperature characteristics of a refrigerant used in a compressor. In the example illustrated in FIG. 15, the horizontal axis represents a temperature, and the vertical axis represents a permittivity of the refrigerant.

As illustrated in FIG. 15, generally, a refrigerant used in a compressor has temperature characteristics showing that at a lower temperature, the permittivity is higher, and at a higher temperature, the permittivity is lower. That is, when a compressor is operated at a low temperature, the permittivity is high during the period from the start-up to the warm-up of the compressor. This may cause an increase in a leak current.

It is a common procedure to reduce the electrostatic capacitance by improving an insulating material of the compressor or improving the motor structure, in order to suppress a leak current. However, in the present embodiment, it is possible to suppress a leak current by using an operational-state signal of the inverter 2 as the control parameter A, and setting a low carrier frequency at the start-up of the inverter 2.

Particularly, an R32 refrigerant has a higher permittivity than an R410A refrigerant or other refrigerants. Therefore, greater effects can be obtained from a compressor using only an R32 refrigerant or from a compressor with a high ratio of R32 refrigerant.

It is also possible to set an optimum carrier frequency according to an operational state of the inverter 2 at the time of not only a start-up of the inverter 2, but also a stop, a steady operation, and the like.

As described above, according to the power conversion device of the present embodiment, there are provided a power-supply shunt resistance that is provided between an inverter and the negative-voltage side of a DC power supply, and respective-phase lower-arm shunt resistances that are provided between the power-supply shunt resistance and respective-phase lower-arm switching elements, wherein in an ON/OFF state of respective-phase upper-arm switching elements, that is, not only when the inverter output-voltage vector is the zero vector V0, but also when the inverter output-voltage vector is any of the real vectors V1 to V6, respective-phase lower-arm voltages are detected, that are respective voltages between the negative-voltage side of the DC power supply and connection points between the respective-phase lower-arm switching elements and the respective-phase lower-arm shunt resistances, to calculate respective-phase currents that flow through a load device in accordance with detection values of the respective-phase lower-arm voltages. Therefore, an extended phase-current detection period and a simplified phase-current detection procedure can both be achieved. Further, a carrier frequency of a carrier signal, which serves as a reference frequency of each drive signal, is controlled according to a change in a specific control parameter. Consequently, the carrier frequency can be optimized according to the control parameter, and performance of an apparatus or a device can be improved.

In a case where the control parameter is an inverter output frequency, the carrier frequency is so controlled as to become high when the inverter output frequency is high, and to become low when the inverter output frequency is low. More specifically, the carrier frequency is controlled in such a manner as to maintain a constant ratio of the carrier-frequency cycle to one cycle of the inverter output frequency. This makes it possible to achieve both prevention of the controllability in a current computation unit and a drive-signal generation unit from being degraded, and suppression of a switching loss.

When the control parameter is inverter power that is input power or output power of the inverter, or that is a power consumption of the load device, a power calculation unit that calculates the inverter power is provided to control the carrier frequency so as to become low when the inverter power is high, and so as to become high when the inverter power is low, and more specifically, to control the carrier frequency so as to become lower as the inverter power increases. Therefore, a switching loss that increases as the inverter power increases can be suppressed.

When the control parameter is a DC bus-voltage of the inverter, a DC bus-voltage detection unit that detects a DC bus-voltage of the inverter is provided to control the carrier frequency so as to become low when the DC bus-voltage is high, and so as to become high when the DC bus-voltage is low, and more specifically, to control the carrier frequency so as to become lower as the DC bus-voltage increases. Therefore, a switching loss that increases as the DC bus-voltage increases can be suppressed.

When, due to this operation, the DC bus-voltage that is output from the DC power supply is not stabilized, but is changed, then a switching loss becomes relatively higher under the same load conditions. However, as described above, the switching loss can be reduced by decreasing the carrier frequency as the DC bus-voltage increases.

Generally, when the inverter power or DC bus-voltage is high, a radiation fin may be needed depending on the heating value of each switching element that constitutes the inverter. However, in the present embodiment, it is possible to arrange so as not to exceed the heat capacitance of the radiation fin by decreasing the carrier frequency with an increase in inverter power or DC bus-voltage, and therefore suppressing a switching loss. Further, it is possible to downsize this radiation fin.

Particularly, when the inverter is made up of a switching element formed from a WBG semiconductor with a high heat resistance, it is possible to achieve further downsizing of the radiation fin by controlling the carrier frequency to become lower as the inverter power or the DC bus-voltage increases.

Because the switching element formed from the WBG semiconductor also has a high voltage resistance and a high allowable current density, it is possible to downsize the switching element. By using this downsized switching element, it is possible to downsize the inverter or the power conversion device, and accordingly downsize an apparatus or a device having this power conversion device incorporated therein.

Due to a low power loss, it is possible for the switching element to attain high efficiency. Therefore, it is possible to further downsize the inverter and the power conversion device, and accordingly further downsize an apparatus or a device having this power conversion device incorporated therein.

The power conversion device can also be configured to rectify an AC voltage supplied from an AC power supply by a rectifier to obtain a DC power supply. Even in a case where the AC voltage supplied from the AC power supply is varied, and therefore the resultant DC bus-voltage is varied, the power conversion device can still decrease the carrier frequency when the DC bus-voltage becomes high, and accordingly can suppress a switching loss.

When the control parameter is a DC bus-voltage of the inverter, greater effects can be obtained in a configuration, in which at the front stage of the inverter, a converter that boosts or lowers, or that boosts and lowers the DC voltage output from the DC power supply is provided.

In a case where the power conversion device according to the present embodiment is applied to a motor drive device in which the load is a motor, in the configuration in which the converter boosts the DC voltage output from the DC power supply to obtain a DC bus-voltage, it is possible to extend the operational range of the motor. It is also possible to achieve high efficiency of the motor by increasing the number of motor windings to obtain a high voltage and decrease the current.

In a motor with a small usage amount of dysprosium and a low demagnetization resistance, even when the DC bus-voltage is increased to reduce a diamagnetic field generated in a stator in order that the motor can be used within a temperature range and a rotational-speed range identical to those of a motor with a large usage amount of dysprosium, it is still possible to decrease the carrier frequency, and therefore suppress a switching loss.

In the configuration in which the converter lowers the DC voltage output from the DC power supply to obtain a DC bus-voltage, within a range where the motor load is low and the output voltage of the inverter is lower than the DC voltage output from the DC power supply, a DC bus-voltage is obtained which is lowered to a voltage equivalent to the output voltage of the inverter, and the obtained DC bus-voltage is applied to the inverter. This makes it possible to achieve a low loss in each switching element. Further, when the DC bus-voltage becomes high, the carrier frequency is decreased so as to improve the switching-loss suppression effect.

The converter can be configured by only passive elements such as a reactor and a capacitor, or can include a reactor, a capacitor, and a switching element, and be configured to charge/discharge energy to/from the reactor by controlling the switching element to be opened or closed. It is apparent that in either of the configurations, the effects described above can be obtained.

Further, when the converter is configured by a reactor, a capacitor, and a switching element, and a control unit that controls the inverter is configured to control the switching element within the converter to be opened or closed, it is sufficient if the control parameter is a converter operating-state signal that indicates an operating state of the converter. In this case, when the control unit operates the inverter and the converter simultaneously, the control unit sets a low carrier frequency, and therefore can prevent circumstances such as a decrease in controllability because the control unit cannot finish the computation in time, or a stop of an apparatus because the control unit cannot execute a control.

When the power conversion device according to the present embodiment is applied to a motor drive device in which the load is a motor, and when this motor drive device is applied to a compressor for an air conditioner, a refrigerator, a freezer, or other devices, it is sufficient if the control parameter is an operational-state signal that indicates an operational state of the inverter. In this case, setting a low carrier frequency at the start-up of the inverter can suppress a leak current that increases during the period from the start-up to the warm-up of the compressor with a high permittivity of a refrigerant.

Greater effects can be obtained particularly in a compressor using only an R32 refrigerant with a higher permittivity than an R410A and other refrigerants, or in a compressor with a high ratio of R32 refrigerant.

It is also possible to set an optimum carrier frequency according to an operational state of the inverter at the time of not only a start-up of the inverter, but also a stop, a steady operation, and the like.

In the present embodiment described above, the example has been illustrated, in which the power conversion device is applied to a motor drive device in which the load is a motor, and this motor drive device is applied to a compressor for an air conditioner, a refrigerator, a freezer, or other devices. However, this motor drive device is also applicable to an air blower for an air conditioner, a refrigerator, a freezer, or other devices. Even in this case, it is apparent that the effects described in the present embodiment can still be obtained.

The configurations described in the above embodiments are only examples of the configuration of the present invention, and it is possible to combine these configurations with other publicly-known techniques, and it is needless to mention that the present invention can be configured while modifying it without departing from the scope of the invention, such as omitting a part of these configurations.

INDUSTRIAL APPLICABILITY

As describe above, the power conversion device according to the present invention, a motor drive device including the power conversion device, an air blower and a compressor, each of which includes the motor drive device, and an air conditioner, a refrigerator, and a freezer, each of which includes the air blower and the compressor, are useful for a configuration including a PWM-type three-phase inverter. Particularly, they are suitable as a technique to achieve both an extended phase-current detection period and a simplified phase-current detection procedure, and also to improve performance of an apparatus or a device by controlling a carrier frequency.

The invention claimed is:

1. A power conversion device to convert DC power supplied from a DC power supply to AC power, and to supply the AC power to a load device, the power conversion device comprising:
   an inverter that is configured by connecting arms in parallel, each of which is made up of an upper-arm switching element and a lower-arm switching element;
   a shunt resistance that is provided at least between a negative-voltage side of the DC power supply and the respective-phase lower-arm switching elements;
   a voltage detection unit to detect a voltage between the respective-phase lower-arm switching elements and the negative-voltage side of the DC power supply; and
   a control unit to generate drive signals corresponding to the respective-phase upper-arm switching elements and the respective-phase lower-arm switching elements in accordance with values detected by the voltage detection unit,
   wherein the control unit changes a carrier frequency of a carrier signal, which serves as a reference frequency of the drive signals, according to a change in a specific control parameter, and
   wherein the control unit controls the carrier frequency to become high when an output frequency of the inverter is high, and controls the carrier frequency to become low when the output frequency is low.

2. The power conversion device according to claim 1, wherein
   the shunt resistances are a power-supply shunt resistance that is provided between the inverter and the negative-voltage side of the DC power supply, and respective-phase lower-arm shunt resistances that are provided between the power-supply shunt resistance and the respective-phase lower-arm switching elements.

3. A motor drive device comprising the power conversion device according to claim 2, wherein
   a load of the power conversion device is a motor load.

4. The motor drive device according to claim 3, wherein the motor load uses a magnet with a dysprosium content that is equal to or greater than 0% and equal to or less than 0.5%, and with a magnetic coercive force that is equal to or less than 1700 kA/m.

5. The power conversion device according to claim 1, wherein
   the control unit controls the carrier frequency in such a manner as to maintain a constant ratio of a cycle of the carrier frequency to one cycle of the output frequency.

6. The power conversion device according to claim 5, wherein
   the control unit holds therein a table representing a relation between the output frequency and the carrier frequency, and controls the carrier frequency to become a value read from the table according to the output frequency.

7. The power conversion device according to claim 1, wherein
   in the control unit, a threshold value for the output frequency, and a first carrier frequency and a second carrier frequency that is higher than the first carrier frequency are set in advance, and
   when the output frequency is equal to or lower than the threshold value, the first carrier frequency is used as the carrier frequency, and when the output frequency is higher than the threshold value, the second carrier frequency is used as the carrier frequency.

8. The power conversion device according to claim 7, wherein
   in the control unit, a threshold value for the inverter power, and a first carrier frequency and a second carrier frequency that is higher than the first carrier frequency are set in advance, and
   when the inverter power is equal to or lower than the threshold value, the second carrier frequency is used as the carrier frequency, and when the inverter power is higher than the threshold value, the first carrier frequency is used as the carrier frequency.

9. The power conversion device according to claim 1, wherein
   the control unit controls the carrier frequency to become low when inverter power is high, where the inverter power is input power or output power of the inverter, or is a power consumption of the load device, and controls the carrier frequency to become high when the inverter power is low.

10. The power conversion device according to claim 9, wherein
    the control unit controls the carrier frequency to become lower as the inverter power increases.

11. The power conversion device according to claim 1, wherein
    the control unit controls the carrier frequency to become low when a DC bus-voltage of the inverter is high, and controls the carrier frequency to become high when the DC bus-voltage is low.

12. The power conversion device according to claim 11, wherein
    the control unit controls the carrier frequency to become lower as the DC bus-voltage increases.

13. The power conversion device according to claim 1, wherein
    the load device is a motor, and
    the control unit controls the carrier frequency to become low when a modulation ratio of the motor is high, and controls the carrier frequency to become high when the modulation ratio is low.

14. The power conversion device according to claim 1, further comprising a converter that converts a DC voltage applied from the DC power supply to the DC bus-voltage at a front stage of the inverter, wherein the control parameter is a converter operating-state signal that indicates an operating state of the converter, and the control unit controls the carrier frequency to become low at a time of an operation of the converter.

15. The power conversion device according to claim 1, wherein the control unit controls the carrier frequency to become low at a time of a start-up of the inverter.

16. The power conversion device according to claim 1, wherein at least one of the respective-phase upper-arm switching elements and the respective-phase lower-arm switching elements is formed from a wide-bandgap semiconductor.

17. A motor drive device comprising the power conversion device according to claim 1, wherein a load of the power conversion device is a motor load.

18. The motor drive device according to claim 17, wherein the motor load uses a magnet with a dysprosium content that is equal to or greater than 0% and equal to or less than 0.5%, and with a magnetic coercive force that is equal to or less than 1700 kA/m.

* * * * *